(12) United States Patent
Sprenger et al.

(10) Patent No.: US 9,760,117 B2
(45) Date of Patent: Sep. 12, 2017

(54) ENABLING STIFF PLASTIC CHASSIS WITH THIN METAL SKINS

(71) Applicant: Intel Corporation, Santa Clara, CA (US)

(72) Inventors: Mark Sprenger, Folsom, CA (US); Paul J. Gwin, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 14/126,258

(22) PCT Filed: Jun. 29, 2013

(86) PCT No.: PCT/US2013/048832
§ 371 (c)(1),
(2) Date: Dec. 13, 2013

(87) PCT Pub. No.: WO2014/209410
PCT Pub. Date: Dec. 31, 2014

(65) Prior Publication Data
US 2015/0192958 A1  Jul. 9, 2015

(51) Int. Cl.
*G06F 1/16* (2006.01)
*H05K 5/00* (2006.01)
(Continued)

(52) U.S. Cl.
CPC .......... *G06F 1/1633* (2013.01); *B21D 22/02* (2013.01); *C23C 26/00* (2013.01); *G06F 1/1656* (2013.01);
(Continued)

(58) Field of Classification Search
CPC .......... G06F 1/181; G06F 1/16; G06F 1/1601; G06F 1/1616; G06F 1/203; G06F 1/1684;
(Continued)

(56) References Cited

U.S. PATENT DOCUMENTS 6,819,559 B1 * 11/2004 Seeger .................... G06F 1/203
126/684
8,243,424 B1 * 8/2012 Babu ..................... G06F 1/1601
361/679.01

(Continued)

FOREIGN PATENT DOCUMENTS

KR  10-2011-0032233  3/2011

OTHER PUBLICATIONS

PCT International Search Report and Written Opinion in PCT International Application Serial No. PCT/US2013/048832 mailed on Mar. 4, 2014.
(Continued)

*Primary Examiner* — Marlon Fletcher
(74) *Attorney, Agent, or Firm* — Patent Capital Group

(57) ABSTRACT

Particular embodiments described herein provide for an electronic device, such as a notebook computer, laptop, or tablet that includes a circuit board coupled to a plurality of electronic components (which may include any type of components, elements, circuitry, etc.). One particular example implementation of an information-processing device includes a logic component mounted on a circuit board. The information-processing device also includes a plastic layer surrounding the logic component. Further, the information-processing device includes a first metal layer surrounding the logic component. The plastic layer is integrated with the first metal layer.

14 Claims, 5 Drawing Sheets

(51) Int. Cl.
  *H05K 7/00* (2006.01)
  *B21D 22/02* (2006.01)
  *C23C 26/00* (2006.01)
(52) U.S. Cl.
  CPC ....... *G06F 1/1662* (2013.01); *Y10T 29/49002* (2015.01)
(58) Field of Classification Search
  CPC ...... G06F 1/185; G06F 1/1662; G06F 3/0202; G06F 1/1633; G06F 1/183; G06F 1/184; H05K 9/0007; H05K 9/0081; H05K 5/00; H05K 5/03; H05K 5/04; H05K 3/361
  See application file for complete search history.

(56) References Cited

U.S. PATENT DOCUMENTS

| | | | | |
|---|---|---|---|---|
| 8,981,243 | B2* | 3/2015 | Leong | H01H 3/125 200/341 |
| 9,146,620 | B2* | 9/2015 | Whitt, III | G06F 1/1618 |
| 2002/0144032 | A1 | 10/2002 | Krige et al. | |
| 2005/0264528 | A1* | 12/2005 | Burry | G06F 3/0338 345/157 |
| 2009/0237415 | A1* | 9/2009 | Athas | G09G 3/3406 345/589 |
| 2009/0262029 | A1* | 10/2009 | Chiang | H01Q 1/2266 343/702 |
| 2010/0270052 | A1 | 10/2010 | Crohas et al. | |
| 2010/0315399 | A1* | 12/2010 | Jacobson | B32B 33/00 345/211 |
| 2010/0321253 | A1* | 12/2010 | Ayala Vazquez | H01Q 1/2258 343/702 |
| 2011/0090632 | A1* | 4/2011 | Raff | G06F 1/1616 361/679.27 |
| 2011/0090712 | A1 | 4/2011 | Bergeron et al. | |
| 2012/0250250 | A1 | 10/2012 | Tatebe | |
| 2013/0295725 | A1* | 11/2013 | Park | H01L 24/19 438/124 |
| 2014/0126135 | A1* | 5/2014 | Abbatiello | B29C 70/68 361/679.31 |
| 2014/0169853 | A1* | 6/2014 | Sharma | G06F 3/0202 400/481 |
| 2014/0203988 | A1* | 7/2014 | Yang | H01Q 7/00 343/842 |
| 2015/0192958 | A1* | 7/2015 | Sprenger | G06F 1/1656 361/679.09 |

OTHER PUBLICATIONS

PCT International Preliminary Report on Patentability in PCT International Application No. PCT/US2013/048832 mailed on Dec. 29, 2015.
European Search Report issued in European Application No. 13888043.0 on Nov. 7, 2016; 20 pages.

* cited by examiner

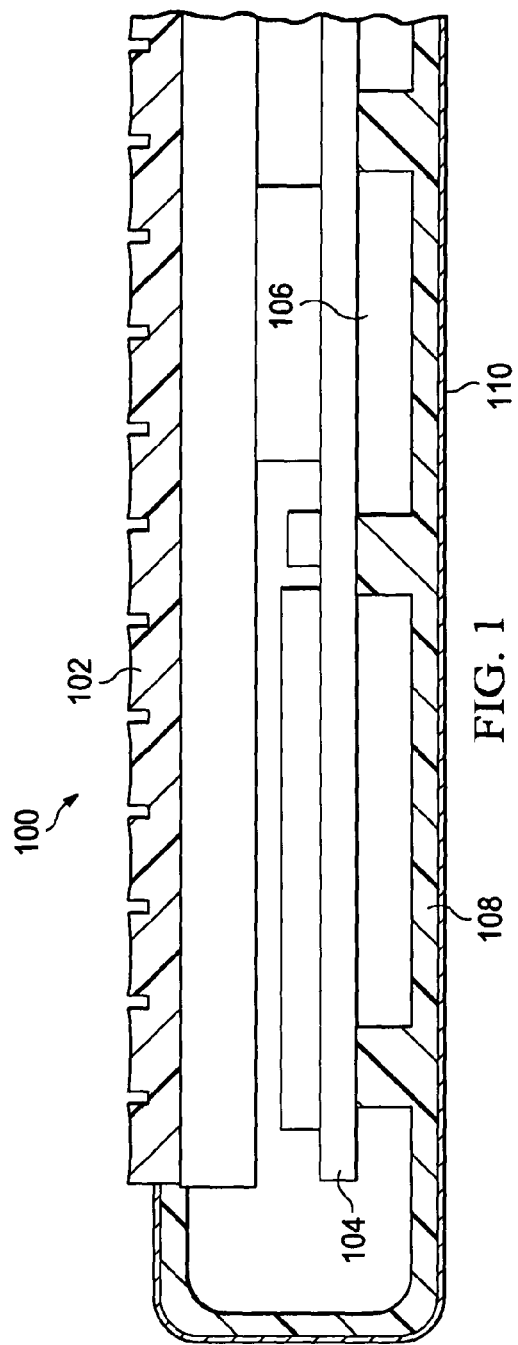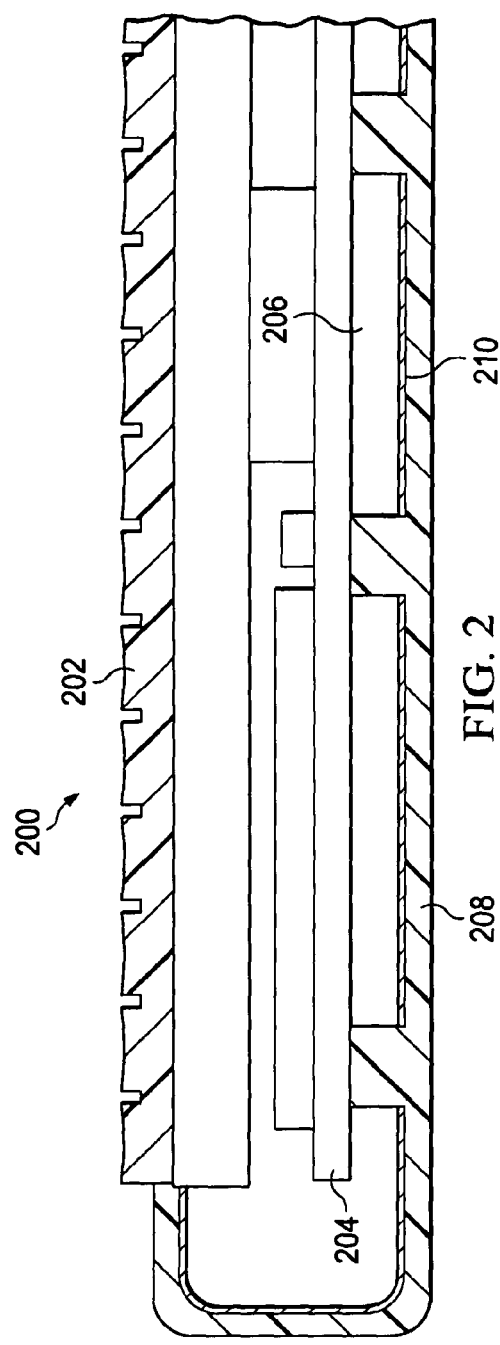

ENABLING STIFF PLASTIC CHASSIS WITH THIN METAL SKINS

TECHNICAL FIELD

This disclosure relates, in general, to the field of structural reinforcement and, more particularly, to creating a metal/plastic hybrid chassis for an electronic device.

BACKGROUND

Responsive to customer demands, laptop computers are becoming lighter and thinner. Manufacturers attempt to meet those demands, in part, by using less material in the chassis of the laptop computers. This lessening of the material leads to increased challenges in making the chassis sufficiently rigid to produce a high quality user experience. Some chassis are made entirely of plastic. In the case of low-cost plastic chassis (e.g., injection molded plastics), emphasis is currently placed on structural design. This emphasis limits the flexibility of an original design manufacturer (ODM) in terms of its manufacturing environment, because a simple change to improve the manufacturability at the ODM can nullify the structural design. Such nullification can destroy the structural quality of the chassis and the resulting end user experience.

Further, some chassis are made entirely of metal to produce a chassis that is stiffer than an all-plastic chassis. However, there are several issues with all-metal chassis. For example, a manufacturing process of a stamped chassis might not produce the look or texture desired, due to its manufacturing process. Indeed, best-in-class chassis designs are typically machined from metal to give the quality feel that higher-end consumers seek. These metal chassis are currently machined inside and out to achieve geometrical and surface finish requirements. However, this machining process is expensive and time consuming: it includes a multistep manufacturing process that takes more than an hour to complete a single D-Cover.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1 illustrates one possible embodiment of an integrated metal/plastic hybrid chassis in accordance with the present disclosure;

FIG. 2 illustrates another possible embodiment of an integrated metal/plastic hybrid chassis in accordance with the present disclosure;

DETAILED DESCRIPTION

Overview

Figure 3:
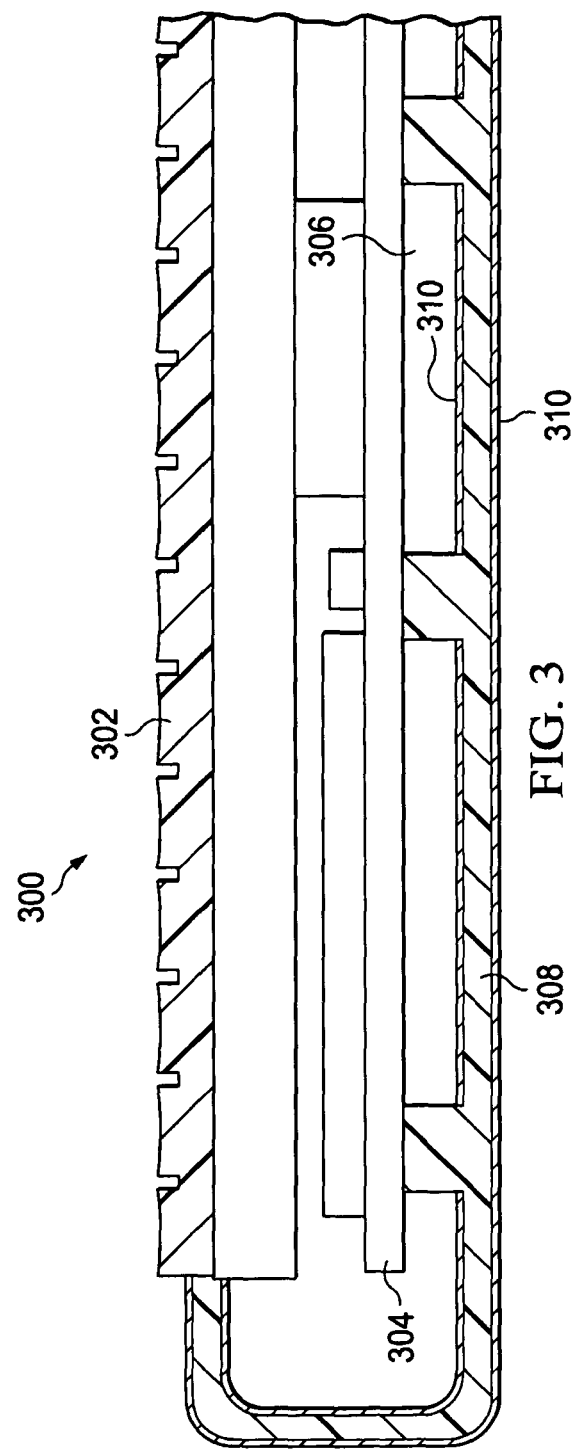
FIG. 3 illustrates an additional possible embodiment of an integrated metal/plastic hybrid chassis in accordance with the present disclosure.

An information-processing device is provided in one example and includes a logic component mounted on a circuit board; a plastic layer surrounding the logic component; and a first metal layer surrounding the logic component, where the plastic layer is integrated with the first metal layer. In one example, the plastic layer is interposed between the first metal layer and the logic component. The information-processing device can include a keyboard protruding from an upper surface of the information-processing device, where the first metal layer is disposed above the plastic layer on the upper surface.

In another example, the first metal layer is interposed between the plastic layer and the logic component. The information-processing device can include a keyboard protruding from an upper surface of the information-processing device, where the plastic layer is disposed above the first metal layer on the upper surface. The information-processing device can include a second metal layer, where the plastic layer is interposed between the first metal layer and the second metal layer. In one embodiment, the information-processing device includes a keyboard protruding from an upper surface of the information-processing device, where the plastic layer is interposed between the first metal layer and the second metal layer at the upper surface.

The information-processing device can include an antenna. In one embodiment, the first metal layer does not overlap with the antenna. In another embodiment, the first metal layer extends from a portion of the information-processing device nearest to a display to only a midpoint of the width of the information-processing device. The logic component can be a processor, and the plastic layer does not necessarily overlap with the processor. In one example, the first metal layer does not extend past the last quarter of a width of the information-processing device. In one embodiment, the first metal layer is a shape memory alloy.

An information-processing device is provided by another implementation and includes a logic component mounted on a circuit board; a plastic layer surrounding the logic component; and means for stiffening the information-processing device, where the plastic layer is integrated with the means for stiffening. The information-processing device can include a keyboard protruding from an upper surface of the information-processing device, where the keyboard inputs data to the logic component. The information-processing device can include an antenna, where the means for stiffening does not overlap with the antenna. In one example, the logic component is a processor, and the plastic layer does not overlap with the processor.

A method of manufacturing a device is provided in another example and includes stamping a metal sheet; placing the metal sheet in a mold; and injecting plastic onto the metal sheet in the mold. The method can also include inserting computer components in a concave portion of the plastic. The method can additionally include treating the metal sheet.

A method of manufacturing a device is included in a further example and includes injection molding a plastic layer; and plating a metal onto the plastic layer. The method can also include inserting computer components in a concave portion of the plastic layer.

Example Embodiments

FIG. 1 illustrates one possible embodiment of an integrated metal/plastic hybrid chassis in accordance with the present disclosure. This disclosure provides a method to manufacture a low-cost injection molded plastic chassis with a rigidity closer to that of an all-metal chassis. This manufacturing produces an integrated thin metal skin on an inner or outer surface of the plastic closure. Specifically, FIG. 1 shows a keyboard housing 100 of a laptop computer. The keyboard housing 100 includes a keyboard 102, a printed circuit board (PCB) 104, boss features 106, an injected plastic layer 108, and a thin metal skin 110.

The keyboard housing 100 includes the keyboard 102 at an upper surface of the keyboard housing 100. The keyboard 102 is a standard keyboard, although the keyboard 102 can be supplemented or replaced with a numeric keypad. The PCB 104 is a non-conductive substrate on which a logic component, such as a processor, is mounted. The PCB 104 is, for example, a motherboard. In one embodiment, the PCB 104 includes an antenna, such as for wireless network connections (e.g., WiFi or Bluetooth) or Near-Field Communications (NFC). The boss features 106 include connectors, such as to headphones, a Universal Serial Bus (USB), Ethernet, and a High-Definition Multimedia Interface (HDMI).

The plastic layer 108 and the metal skin 110 are bonded to form an integrated metal/plastic hybrid chassis. The thickness of the metal sheet 110 is approximately 0.01 microns to 200 microns. The thickness of the plastic layer 108 is approximately 10 microns to 1.0 mm. Note that in other embodiments, the plastic layers, skins, chassis, etc. be of any suitable size, shape, dimensions, placements, etc. It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

In the embodiment illustrated in FIG. 1, the metal skin 110 is on the lower surface of the keyboard housing 100. The plastic layer 108 is interposed between the PCB 104 and boss features 106 on one hand, and the metal skin 110 on the other. The metal skin 110 is also on the upper surface of the keyboard housing 100, which is the surface from which the keys of keyboard 102 protrude.

The inclusion of the metal skin 110 in the chassis can provide several benefits. For example, the metal skin 110 improves the stiffness of the chassis relative to an all-plastic chassis. Indeed, the metal skin 110 can create a stiff hybrid structure with a modulus approximately 10-15 times that of plastic layer 108 alone. Further, the stiffness varies with the cube of thickness: thus, a thin metal layer can contribute to the overall stiffness as much as a substantially greater thickness of plastic. Thus, it becomes possible to manufacture a thinner laptop computer.

Various ferrous/alloy materials may be used in the embodiments discussed herein. In addition, other embodiments may include the use of magnetic materials, aluminums, graphites, etc. and polymers (e.g., heat resistant material, polymers, any type of plastic, synthetic rubber, etc.). Still other configurations may include certain integrations of these materials, which may be based on particular working needs, specific device frameworks, etc.

Further, including the metal skin 110 on the exterior of the keyboard housing 100 can provide flammability resistance to plastic layer 108. Typically, including only a thin plastic layer hinders manufacturers from satisfying a flammability-rating requirement. However, metal skin 110 can help satisfy a flammability rating even if plastic layer 108 is thin.

Further, metal skin 110 can function as a heat sink. This functionality is particularly useful in the case of an explosion in keyboard housing 100 of, for example, the logic component. In addition, the metal skin 110 acts as a combustion barrier to the plastic layer 108. Additionally, because metal skin 110 is typically stronger than plastic layer 108, metal skin 110 provides enhanced dent resistance. That is, the metal skin 110 can provide an increased durability to impact.

The metal skin 110 can also provide shielding from external electromagnetic interference to elements in the keyboard housing 100. Further, the metal skin 110 spreads out heat, because its thermal conductivity is much higher than that of the plastic layer 108. Spreading heat quickly will dissipate "hot spots." Hot spots on the bottom of the computer are uncomfortable to users. In addition, metal skin 110 can prevent a structural breakdown of the plastic layer 108 due to excess heat. In addition, the metal skin 110 can provide a desirable finish and the cosmetic feature of a desirable look.

In addition to advantages over a plastic chassis, a metal/plastic hybrid chassis can, in certain embodiments, provide advantages over a metal chassis. Notably, the metal/plastic hybrid chassis is lighter than a metal chassis. This weight savings can be rolled into additional design flexibility in, e.g., an increased battery mass. In addition, the dent resistance of the metal/plastic hybrid chassis is better than that of an all-metal chassis as well.

FIG. 2 illustrates another possible embodiment of an integrated metal/plastic hybrid chassis in accordance with the present disclosure. Specifically, FIG. 2 shows a keyboard housing 200 of a laptop computer. The keyboard housing 200 includes a keyboard 202, a printed circuit board (PCB) 204, boss features 206, an injected plastic layer 208, and a thin metal skin 210. Keyboard 202 is similar to keyboard 102, PCB 204 is similar to PCB 104, boss features 206 are similar to boss features 106, and plastic layer 208 is similar to plastic layer 108. Thus, further discussion of the components of keyboard housing 200 is unnecessary.

Keyboard housing 200 differs from keyboard housing 100 in that metal skin 210 is internal to keyboard housing 200. Specifically, metal skin 210 is interposed between PCB 204 and boss features 206 on one hand, and plastic layer 208 on the other. Further, plastic layer 208 is on the upper surface of keyboard housing 200, which is the surface from which the keys of keyboard 202 protrude.

In some embodiments, plastic layer 208 is opaque, and metal skin 210 is non-cosmetic. Accordingly, metal skin 210 does not need to undergo machining.

Further, metal skin 210 can provide thermal management to keyboard housing 200. Because metal skin 210 spreads out heat, it is possible to prevent hot spots forming on the bottom surface of the keyboard housing 200. In addition, plastic layer 208 provides heat insulation, thereby further reducing the effect of hot spots.

FIG. 3 illustrates an additional embodiment of an integrated metal/plastic hybrid chassis in accordance with the present disclosure. Specifically, FIG. 3 shows a keyboard housing 300 of a laptop computer. The keyboard housing 300 includes a keyboard 302, a printed circuit board (PCB) 304, boss features 306, an injected plastic layer 308, and a thin metal skin 310. Keyboard 302 is similar to keyboard 102, PCB 304 is similar to PCB 104, boss features 306 are similar to boss features 106, and plastic layer 308 is similar to plastic layer 108. Thus, further discussion of the components of keyboard housing 300 is unnecessary.

Keyboard housing 300 differs from keyboard housing 100 in that, in addition to being on the lower surface of keyboard housing 300, metal skin 310 is also internal to keyboard housing 300. That is, plastic layer 308 is interposed between layers of metal skin 310. Metal layer 310 is on the upper surface of the keyboard housing 300, which is the surface from which the keys of keyboard 302 protrude. Thus, a sandwich structure can be created by applying metal 310 to both the inside and outside of the plastic layer 308. This sandwich structure can provide the highest stiffness among the embodiments. Metal skin 310, as well as metal skins 110 and 210, are examples of a means for stiffening an information-processing device.

Figure 4:
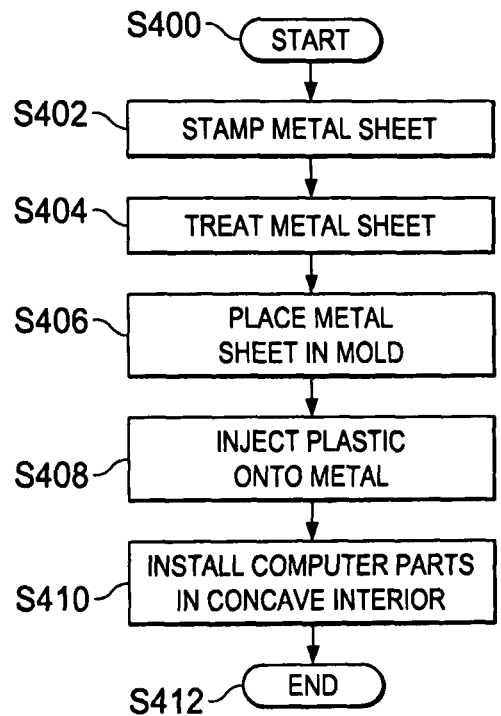
FIG. 4 is a simplified flow diagram illustrating an integrated metal/plastic hybrid chassis manufacturing operation in accordance with one embodiment of the present disclosure.

FIG. 4 is a simplified flow diagram illustrating a potential manufacturing operation of a keyboard housing of a laptop computer in accordance with the present disclosure. The manufacturing operation begins at 5400. The operations then proceed to S402, in which a metal sheet is stamped. Subsequently, the operations advance to S404.

In S404, the metal sheet is treated in at least one of various ways. For example, in one embodiment, a microstructure is produced on the metal. This microstructure can be produced by growing oxides on the metal or through micro-machining, such as etching the metal surface. These microstructures can provide the metal with a strong bond to the plastic (nano-molding).

In another example, a primer is applied to the metal. This primer can provide a mechanical bond between the metal skin and the plastic layer through an interference of geometry. Additionally or alternatively, a covalent bond can be formed between the primer and the metal skin.

The metal sheet is then placed in a mold in S406. Plastic is injection-molded onto the metal sheet in S408. In a manufacturing process for the keyboard housing 300, the plastic can be injection-molded between the upper and lower metal skins 310. In S410, computer parts, such as a processor, a motherboard, and a keyboard are installed into the interior of the integrated metal/plastic hybrid chassis. In one example of S410, the interior of the integrated metal/plastic hybrid chassis is a concave portion. The operations conclude at 5412.

Because the metal/plastic hybrid chassis is formed from a stamped metal in S404, the overall cost for the chassis is significantly lower than the cost of an all-metal chassis. In addition, the manufacturing time is significantly lowered, because stamping and injection-molding are very fast processes.

When the keyboard housings 100 and 300 are manufactured by the operations of FIG. 4, the operations provide metal skin 110, 310 outside of plastic layer 108, 308 without electroplating the plastic layer 108, 308. Thus, the operations of FIG. 4 can provide multiple advantages. For example, electroplating can lead to an undesirable manufacturing expense. In addition, in some electroplating processes, a nickel plating follows a copper plating. Such electroplating processes pose a dermatologic allergic risk associated with exposure to those metals.

Figure 5:
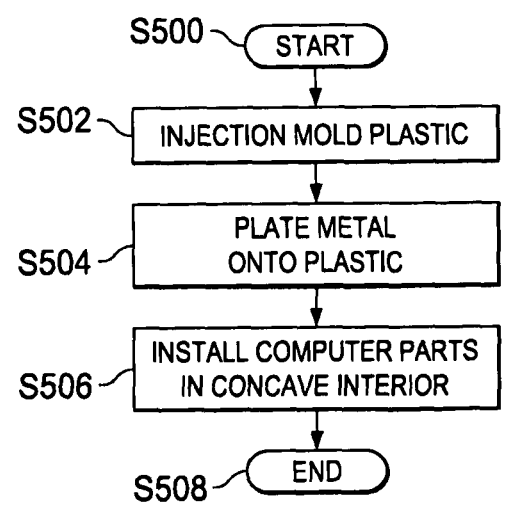
FIG. 5 is a simplified flow diagram illustrating an integrated metal/plastic hybrid chassis manufacturing operation in accordance with one embodiment of the present disclosure.

FIG. 5 is a simplified flow diagram illustrating another potential manufacturing operation of a keyboard housing of a laptop computer in accordance with the present disclosure. The operations of FIG. 5 begin at 5500. The operations proceed to S502, in which a plastic is injection-molded. A metal is then plated onto the plastic at S504. In S506, computer parts, such as a processor, motherboard, and keyboard are installed into the interior of the integrated metal/plastic hybrid chassis. As discussed previously, the interior of the metal/plastic hybrid chassis is typically a concave portion. The operations are completed in S508.

To summarize, a plastic layer can be supplemented with an integrated metal skin. Significant reduction in manufacturing time over an all-metal chassis can be achieved, yielding a desirable volume production rate capability.

Figure 6:
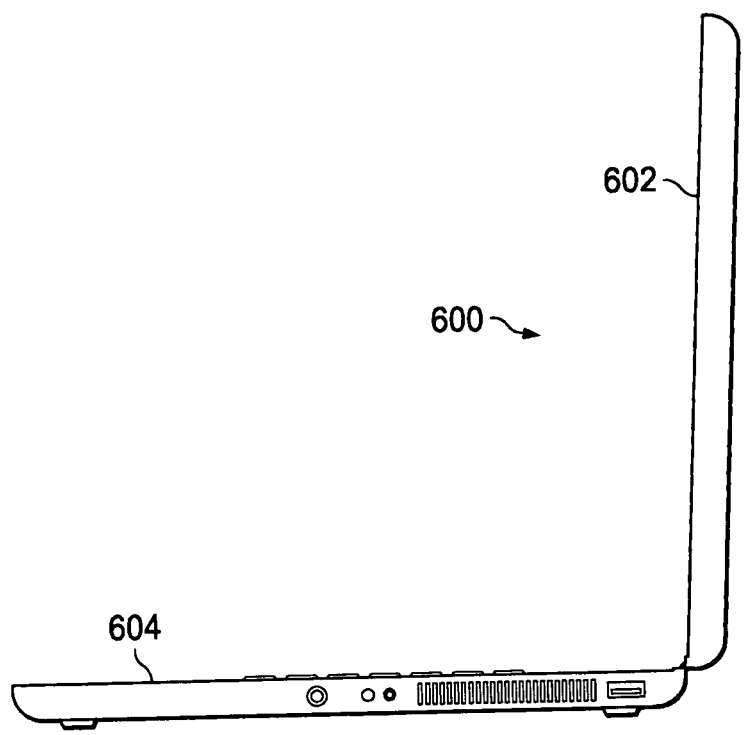
FIG. 6 illustrates a laptop computer in accordance with one embodiment of the present disclosure.

FIG. 6 is a simplified diagram illustrating a laptop computer 600 in accordance with one embodiment of the present disclosure. The laptop computer 600 includes a casing including an upper section 602 and a lower section 604. The upper section 602 includes a display and pivots about the lower section 604. The lower section 604 is a keyboard housing (e.g., keyboard housing 100, 200, 300).

The aforementioned description is presented by way of example only and is not intended to be limiting. For example, the display can be replaced with a touchscreen. The keyboard can be supplemented with a touchpad, a pointing stick, or hardware buttons. Further, any element in the upper section 602 can be alternatively or additionally included in the lower section 604 or can be excluded entirely. Similarly, any element in the lower section 604 can be alternatively or additionally included in the upper section 602 or can be excluded entirely.

Figure 7:
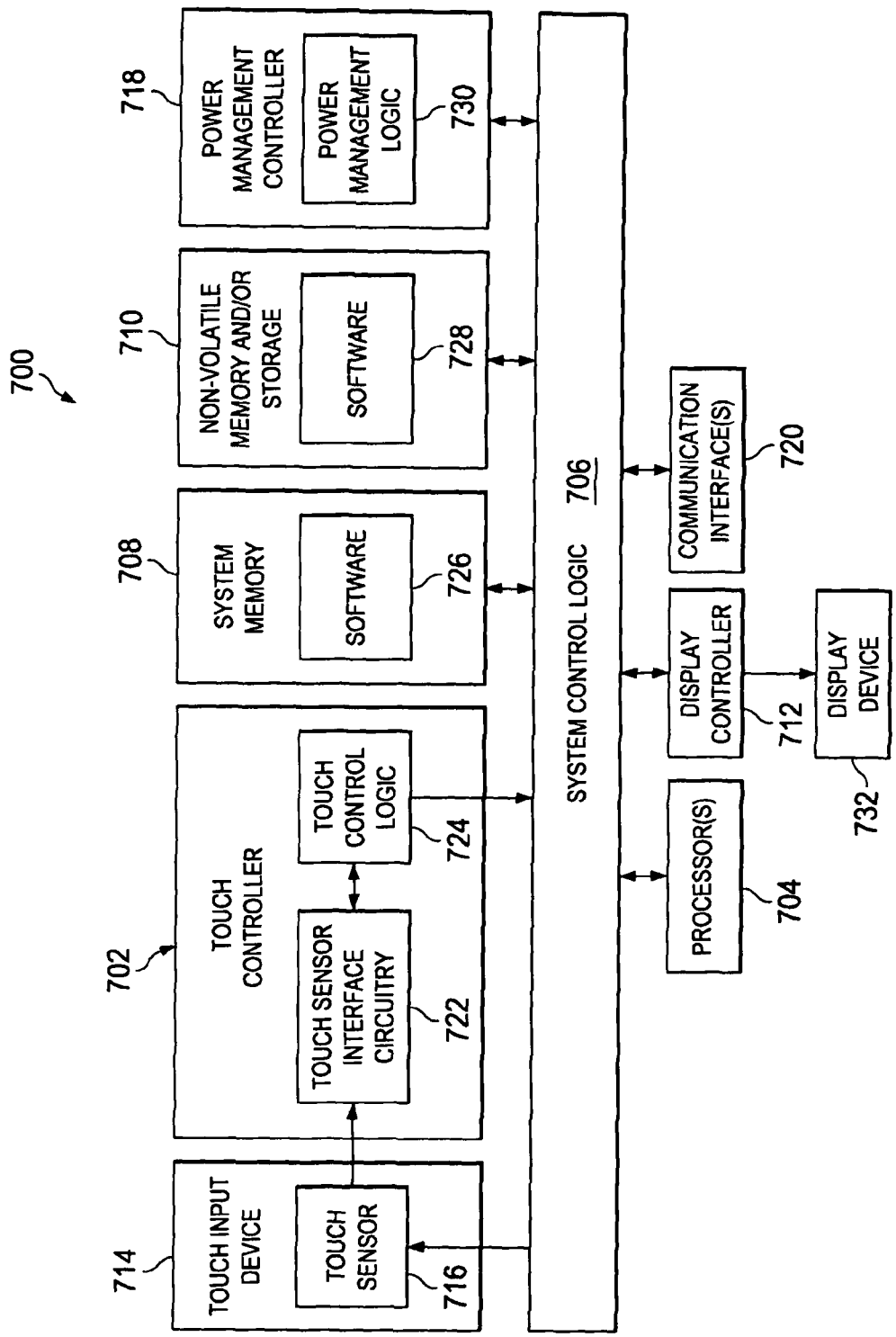
FIG. 7 illustrates components of a laptop computer in accordance with one embodiment of the present disclosure.

FIG. 7 is a simplified block diagram illustrating potential electronics associated with a laptop computer. More particularly, FIG. 7 illustrates an embodiment of an example system 700 that can be included in any portion (or shared by portions) of the laptop computer. System 700 includes a touch input device 714, a touch controller 702, one or more processors 704, system control logic 706 coupled to at least one of processor(s) 704, system memory 708 coupled to system control logic 706, non-volatile memory and/or storage device(s) 710 coupled to system control logic 706, display controller 712 coupled to system control logic 706, display controller 712 coupled to a display, power management controller 718 coupled to system control logic 706, and communication interface(s) 720 coupled to system control logic 706.

Touch input device 714 includes touch sensor 716, and each can be implemented using any suitable touch-sensitive technology such as, for example and without limitation, capacitive, resistive, surface acoustic wave (SAW), infrared, and optical imaging. Touch input device 714, in a particular embodiment, is implemented using any suitable multi-touch technology.

System control logic 706, in a particular embodiment, includes any suitable interface controllers to provide for any suitable interface to at least one processor 704 and/or to any suitable device or component in communication with system control logic 706. System control logic 706, in a particular embodiment, includes one or more memory controllers to provide an interface to system memory 708. System memory 708 can be used to load and store data and/or instructions, such as software 726, for example, for system 700. System memory 708, in a particular embodiment, includes any suitable volatile memory, such as suitable dynamic random access memory (DRAM) or SDRAM, for example. System control logic 706, in a particular embodiment, includes one or more input/output (I/O) controllers to provide an interface to a display device 732, touch controller 702, and non-volatile memory and/or storage device(s) 710.

Non-volatile memory and/or storage device(s) 710 can be used to store data and/or instructions, for example, within software 728. Non-volatile memory and/or storage device(s) 710 can include any suitable non-volatile memory, such as flash memory, for example, and/or any suitable non-volatile storage device(s), such as one or more hard disc drives (HDDs), one or more compact disc (CD) drives, and/or one or more digital versatile disc (DVD) drives, for example.

Power management controller 718 includes power management logic 730 configured to control various power management and/or power saving functions of laptop computer 700 based upon whether laptop computer 700 is in an open configuration or a closed configuration and/or a physical orientation of laptop computer 700. In one embodiment, power management controller 718 is configured to reduce the power consumption of components or devices of system 700 that can either be operated at reduced power or turned off when laptop computer 700 is in the closed configuration. For example, in a particular embodiment when laptop computer 700 is in a closed configuration, power management controller 718 performs one or more of the following: power down the unused portion of the display and/or any backlight associated therewith; allow one or more of processor(s) 704 to go to a lower power state if less computing power is required in the closed configuration; and shutdown any devices and/or components, such as a keyboard, that are unused when laptop computer 700 is in the closed configuration.

Communications interface(s) 720 can provide an interface for system 700 to communicate over one or more networks and/or with any other suitable device. Communications interface(s) 720 can include any suitable hardware and/or firmware. Communications interface(s) 720, in a particular embodiment, includes, for example, a network adapter, a wireless network adapter, a telephone modem, and/or a wireless modem.

System control logic 706, in a particular embodiment, includes one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For one embodiment, at least one processor 704 can be packaged together with logic for one or more controllers of system control logic 706. In one embodiment, at least one processor 704 is packaged together with logic for one or more controllers of system control logic 706 to form a System in Package (SiP). In one embodiment, at least one processor 704 is integrated on the same die with logic for one or more controllers of system control logic 706. For a particular embodiment, at least one processor 704 is integrated on the same die with logic for one or more controllers of system control logic 706 to form a System on Chip (SoC).

For touch control, touch controller 702 can include touch sensor interface circuitry 722 and touch control logic 724. Touch sensor interface circuitry 722 can be coupled to detect touch input over a first touch surface layer and a second touch surface layer of a display (e.g., display device 732). Touch sensor interface circuitry 722 can include any suitable circuitry that can depend, for example, at least in part, on the touch-sensitive technology used for touch input device 714. Touch sensor interface circuitry 722, in one embodiment, can support any suitable multi-touch technology. Touch sensor interface circuitry 722, in one embodiment, includes any suitable circuitry to convert analog signals corresponding to a first touch surface layer and a second surface layer into any suitable digital touch input data. Suitable digital touch input data for one embodiment includes, for example, touch location or coordinate data.

Touch control logic 724 can be coupled to help control touch sensor interface circuitry 722 in any suitable manner to detect touch input over a first touch surface layer and a second touch surface layer. Touch control logic 724 for one embodiment can also be coupled to output in any suitable manner digital touch input data corresponding to touch input detected by touch sensor interface circuitry 722. Touch control logic 724 can be implemented using any suitable logic, including any suitable hardware, firmware, and/or software logic (e.g., non-transitory tangible media), that can depend, for example, at least in part on the circuitry used for touch sensor interface circuitry 722. Touch control logic 724 for one embodiment supports any suitable multi-touch technology.

Touch control logic 724 can be coupled to output digital touch input data to system control logic 706 and/or at least one processor 704 for processing. At least one processor 704 for one embodiment can execute any suitable software to process digital touch input data output from touch control logic 724. Suitable software can include, for example, any suitable driver software and/or any suitable application software. As illustrated in FIG. 7, system memory 708 can store suitable software 726 and/or non-volatile memory and/or storage device(s).

Non-Exhaustive, Potential Modifications and Alternatives

The present disclosure has been made in view of a providing a keyboard housing for a laptop computer. However, the teachings are equally applicable to other information-processing devices, such as an electronic book, tablet computer, cellular telephone, or portable music player.

In one modification, only the upper surface or the lower surface of the keyboard housing includes the integrated metal/plastic hybrid structure. That is, the upper surface or the lower surface is all-plastic or all-metal.

In another modification, the upper portion 602 of the laptop computer includes the integrated metal/plastic hybrid structure. As discussed above, the upper portion 602 of the laptop computer can have the integrated hybrid structure on only one surface (e.g., the inner surface surrounding the display) and have the opposing portion made as all-plastic or all-metal or can have the integrated hybrid structure on both surfaces. In any of such cases, the lower portion 604 need not include the hybrid structure. It is specifically contemplated that all surfaces include the integrated metal/plastic hybrid structure. It is also contemplated that not all of the surfaces include the integrated metal/plastic hybrid structure.

In some embodiments, the integrated plastic layer (e.g., plastic layer 108) is not uniform in terms of housing coverage and/or thickness. For example, some manufacturers place their processors on a peripheral side of the casing. This processor placement prevents the heat generated by the processor from flowing over other components. In this placement, an internal fan can efficiently move the heat out of the keyboard housing. Thus, the plastic layer can have a reduced thickness or simply be absent in the area over the processor, thereby increasing the heat dissipation. In one example, the plastic layer extends from one end of the keyboard housing across three-fourths of the length of the keyboard housing and does not cover the remaining one-fourth. Alternatively, the plastic layer has a reduced thickness over the remaining one-fourth. Other ratios are possible, of course. In addition, this modification is not limited to a general processor and can also be applied to other components, such as the Graphics Processing Unit (GPU).

An internal metal layer, such as metal skin 210, need not be uniform of housing coverage and/or thickness. Specifically, in one embodiment, this antenna uses Near-Field Communication (NFC) to allow communication with an integrated circuit (IC) card near the antenna. In some embodiments, NFC antennas are located at the front of the keyboard housing, such as in the palm rest assembly. Accordingly, an internal metal skin can extend from one end of the keyboard housing across one-half of the width of the computer housing and not cover the remaining one-half (e.g., the frontmost half). Alternatively, the metal skin has a reduced thickness over the remaining one-half. Other ratios are possible, of course. Further, this modification is not limited to an NFC antenna and can also be applied to another wireless component, such as a wireless network card supporting, e.g., WiFi.

Further, the metal skin can be embodied as, or supplemented with, stiffening ribs to increase the stiffness of the integrated metal/plastic hybrid structure. In addition, the metal skin can be thicker in areas of structural reinforcement. Such areas include the corners of a laptop computer, as well as edges around flat panels. Reinforcement is also beneficial in areas in which materials change. For example, the area surrounding a keyboard or a touchpad can include a thickened metal layer.

In one modification, the integrated metal/plastic hybrid chassis includes multiple plastics. One of the plastics is selected for its adhesion properties to metal. Another one of the plastics can then be selected for a different property, such as stiffness.

In a further modification, the integrated metal/plastic hybrid chassis includes multiple sheets of metal. A structure including such multiple sheets of metal can include clad metals. Clad metals tend to be formed by diffusion bonding. Thus, one of the metals can be selected to bond to the plastic. Another one of the metals can be selected for a different property, such as stiffness or cosmetics.

Further, different portions of the metal skins can be made of different metals. For example, metal skin 310 on the lower surface of keyboard housing 300 can be made of one metal, and metal skin 310 inside of keyboard housing 300 can be made of a different metal.

In one embodiment, the metal skin 310 is a Shape Memory Alloy (SMA), such as a copper-aluminum-nickel alloy or nickel-titanium alloy. These SMAs have an ultra high strain recovery, thereby significantly increasing dent resistance.

To produce, e.g., a keyboard housing 300 including an SMA, a thin sheet SMA is preformed and trained to form a stable shape of the chassis—its "shape memory." The sheets are stamped of thin stock sheet (0.1 mm to 0.2 mm) and heated for shape training. This preformed sheet is then placed in a mold, and the plastic structure of the chassis is back-injected onto the surface of the preformed SMA.

This process creates a stiff composite structure with a modulus 8-12 times that of the base plastic. At the same time, the metal is superelastic (8% strain capability compared to 0.2% for metals, about 40 times the dent resistance) and capable of resisting dents.

Many bases (e.g., D-Closure) chassis designed for ultra thin and light systems are typically machined from metal billets of aluminum or magnesium. However, these relatively thin, metal chassis are susceptible to denting when placed on other objects, like keys. Metal surfaces such of either top closures (e.g., A-Closures) or D-Closures dent easily, reducing cosmetic appeal and user experience.

Dents are common in metal chassis—so much so that quite a following has emerged online for "DentBook Pro" YouTube videos with Do-It-Yourself instructions for fixing a dented metal chassis. Further, many companies advertise computer dent removal online. Indeed, computer body shop services have sprung up as part of IT company offerings. Nevertheless, SMAs are not currently being used in the consumer electronics industry as chassis materials.

The manufacturing operations of FIGS. 4-5 can be modified to produce the metal skins in different operations. For example, the inner portion of metal skin 310 can be made by plating and the outer portion of metal skin 310 can be made by stamping. This modification is particularly advantageous in the context of different metals, in which one of the metals is produced by operations that are not necessarily appropriate for another one of the metals. Of course, the metal skins can be produced by different operations, even if the metal is itself the same, to provide different structural aspects in the resulting metal skins. These operations can differ for other reasons, as well, such as manufacturing efficiency.

In an example described above, a metal sheet was stamped at S402. However, the metal sheet can be processed into a predetermined form through operations other than stamping. For example, the metal sheet can be hydroformed or bent.

In an example discussed above, a primer was applied to the metal in S404. In some embodiments, the plastic is not injection-molded onto the metal in S408 but is merely formed through injection-molding. A primer is then applied to the plastic. Thus, a covalent bond can be formed between the primer and the plastic layer. The primed plastic is then applied to the metal skin before parts are installed in S410.

In an example previously described, a metal skin was plated onto the plastic layer at S504. However, the metal skin can be formed through operations other than plating. In some embodiments, the metal skin can be electroplated onto the plastic layer. The metal skin can also be thermally sprayed, such as by flame spraying or open air plasma spraying.

In one example embodiment, any number of electrical circuits of the FIGURES may be implemented on a motherboard of an associated electronic device. The motherboard can be a general circuit board that can hold various components of the internal electronic system of the electronic device and, further, provide connectors for other peripherals. More specifically, the motherboard can provide the electrical connections by which the other components of the system can communicate electrically. Any suitable processors (inclusive of digital signal processors, microprocessors, supporting platform hardware, etc.), memory elements, etc. can be suitably coupled to the motherboard based on particular configuration needs, processing demands, computer designs, etc. Other components such as external storage, additional sensors, controllers for audio/video display, and peripheral devices can be attached to the motherboard as plug-in cards, via cables, or integrated into the motherboard itself.

In this disclosure, references to various features (e.g., elements, structures, modules, components, operations, characteristics, etc.) included in "one embodiment," "example embodiment," "an embodiment," "another embodiment," "some embodiments," "various embodiments," "other embodiments," "alternative embodiment," "an implementation," and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art. It is intended the present disclosure encompass all such changes, substitutions, variations, alterations, and modifications as falling within the scope of the appended claims. To assist the United States Patent and Trademark Office (USPTO) and, additionally, any readers of any patent issued on this application in interpreting the claims appended hereto, Applicants wish to note the Applicants: (a) do not intend any of the appended claims to invoke 35 U.S.C. section 112(f) as it exists on the date of the filing hereof unless the words "means for" or "step for" are specifically used in the particular claims; and (b) do not intend, by any statement in the specification, to limit this disclosure in any way that is not otherwise reflected in the appended claims.

Example Embodiment Implementations

One particular example implementation of a system for manufacturing a device, the system comprising means for injection-molding a plastic layer (e.g., using any suitable process, method of manufacture, etc.); and means for plating a metal onto the plastic layer (e.g., using any suitable process, method of manufacture, etc.).

Another example implementation may include an information-processing device, that includes: a logic component mounted on a circuit board; a plastic layer surrounding the logic component; and means for stiffening (e.g., through any suitable material, layer, etc.) the information-processing device, where the plastic layer is integrated (e.g., using any suitable processing, connecting tools, formulating techniques, protocols, etc.) with the means for stiffening.

Other Notes and Examples

Example A1 is an information-processing device that may include a logic component mounted on a circuit board; a plastic layer surrounding the logic component; and a first metal layer surrounding the logic component, where the plastic layer is integrated with the first metal layer.

In Example A2, the subject matter of Example A1 may optionally have the plastic layer being interposed between the first metal layer and the logic component. In Example A3, the subject matter of any of the preceding 'A' Examples can optionally include a keyboard protruding from an upper surface of the information-processing device, where the first metal layer is disposed above the plastic layer on the upper surface.

In Example A4, the subject matter of any of the preceding 'A' Examples can optionally include the first metal layer being interposed between the plastic layer and the logic component. In Example A5, the subject matter of any of the preceding 'A' Examples can optionally include a keyboard protruding from an upper surface of the information-processing device, where the plastic layer is disposed above the first metal layer on the upper surface. In Example A6, the subject matter of any of the preceding 'A' Examples can optionally include a second metal layer, where the plastic layer is interposed between the first metal layer and the second metal layer.

In Example A7, the subject matter of any of the preceding 'A' Examples can optionally include a keyboard protruding from an upper surface of the information-processing device, where the plastic layer is interposed between the first metal layer and the second metal layer at the upper surface. In Example A8, the subject matter of any of the preceding 'A' Examples can optionally include an antenna, where the first metal layer does not overlap with the antenna. In Example A9, the subject matter of any of the preceding 'A' Examples can optionally include an antenna, where the first metal layer extends from a portion of the information-processing device nearest to a display to only a midpoint of the width of the information-processing device.

In Example A10, the subject matter of any of the preceding 'A' Examples can optionally include the logic component being a processor, where the plastic layer does not overlap with the processor. In Example A11, the subject matter of any of the preceding 'A' Examples can optionally include the first metal layer not extending past the last quarter of a width of the information-processing device.

Example E1 is an information-processing device that includes a logic component mounted on a circuit board; a plastic layer surrounding the logic component; and means for stiffening the information-processing device, where the plastic layer is integrated with the means for stiffening.

In Example E2, the subject matter of Example E1 can optionally include a keyboard protruding from an upper surface of the information-processing device, where the keyboard inputs data to the logic component. In Example E3, the subject matter of Example E1 and/or E2 can optionally include an antenna, where the means for stiffening does not overlap with the antenna. In Example E4, the subject matter of any of the preceding 'E' Examples can optionally include the logic component being a processor, and the plastic layer does not overlap with the processor.

Example M1 is a method that may include stamping a metal sheet; placing the metal sheet in a mold; and injecting plastic onto the metal sheet in the mold. In Example M2, the subject matter of Example M1 can optionally include inserting computer components in a concave portion of the plastic. In Example M3, the subject matter of Example M1 and/or M2 can optionally include treating the metal sheet such that a microstructure is produced on the metal sheet.

Example MM1 is a second method that may include a method of manufacturing a device that includes injection-molding a plastic layer; and plating a metal onto the plastic layer. In Example MM2, the subject matter of Example MM1 can optionally include inserting computer components in a concave portion of the plastic layer. In Example MM3, the subject matter of Example MM1 and/or MM2 can optionally include means for injection-molding a plastic layer; and means for plating a metal onto the plastic layer. In Example MM4, the subject matter of any of the preceding 'M' Examples can optionally include a first metal layer being a shape memory alloy (SMA). In Example MM5, the subject matter of any of the preceding 'M' Examples can optionally include the SMA being preformed and trained to form a shape of a chassis, and where a structure of the chassis is back injected onto a surface of the SMA.

Example X1 is a machine-readable storage medium including machine-readable instructions, when executed, to implement a method or realize an apparatus as in any one of the Examples A1-A11, M1-M3, and MM1-MM5. Example Y1 is an apparatus comprising means for performing of any of the Example methods M1-M3 and MM1-MM5. In Example Y2, the subject matter of Example Y1 can optionally include the means for performing the method comprising a processor and a memory. In Example Y3, the subject matter of Example Y2 can optionally include the memory comprising machine-readable instructions, that when executed cause the apparatus to perform any of the Example methods M1-M3 and MM1-MM5.

What is claimed is:

1. An information-processing device, comprising:
   a logic component mounted on a circuit board;
   a plastic layer surrounding the logic component;
   a first metal layer surrounding the logic component, wherein the plastic layer is integrated with the first metal layer, and the first metal layer is interposed between the plastic layer and the logic component; and
   a second metal layer, wherein the plastic layer is interposed between the first metal layer and the second metal layer.

2. The information-processing device of claim 1, further comprising:
   a keyboard protruding from an upper surface of the information-processing device, wherein the plastic layer is interposed between the first metal layer and the second metal layer at the upper surface.

3. The information-processing device of claim 1, further comprising:
   an antenna, wherein the first metal layer does not overlap with the antenna.

4. The information-processing device of claim 1, further comprising:
   an antenna, wherein the first metal layer extends from a portion of the information-processing device nearest to a display to only a midpoint of the width of the information-processing device.

5. The information-processing device of claim 1, wherein the logic component is a processor, and the plastic layer does not overlap with the processor.

6. The information-processing device of claim 1, wherein the first metal layer does not extend past the last quarter of a width of the information-processing device.

7. The information-processing device of claim 1, wherein the first metal layer is a shape memory alloy (SMA).

8. The information-processing device of claim 1, wherein the first metal layer or the second metal layer includes a microstructure.

9. An information-processing device, comprising:
   a logic component mounted on a circuit board;
   a plastic layer surrounding the logic component;
   first means for stiffening the information-processing device, surrounding the logic component, wherein the plastic layer is integrated with the first means for stiffening, and the first means for stiffening is interposed between the plastic layer and the logic component; and
   second means for stiffening the information-processing device, wherein the plastic layer is interposed between the first means and the second means.

10. The information-processing device of claim 9, further comprising:
    a keyboard protruding from an upper surface of the information-processing device, wherein the keyboard inputs data to the logic component.

11. The information-processing device of claim 9, further comprising:
    an antenna, wherein the first means for stiffening does not overlap with the antenna.

12. The information-processing device of claim 9, wherein the logic component is a processor, and the plastic layer does not overlap with the processor.

13. The information-processing device of claim 7, wherein the SMA is preformed and trained to form a shape of a chassis, and a structure of the chassis is back injected onto a surface of the SMA.

14. The information-processing device of claim 10, wherein the keyboard protrudes from the first means for stiffening.

* * * * *